April 19, 1932. L. D. LOVEKIN 1,854,750
PRESSURE AND TEMPERATURE VALVE DEVICE FOR HOT WATER SUPPLIES
Filed May 5, 1931
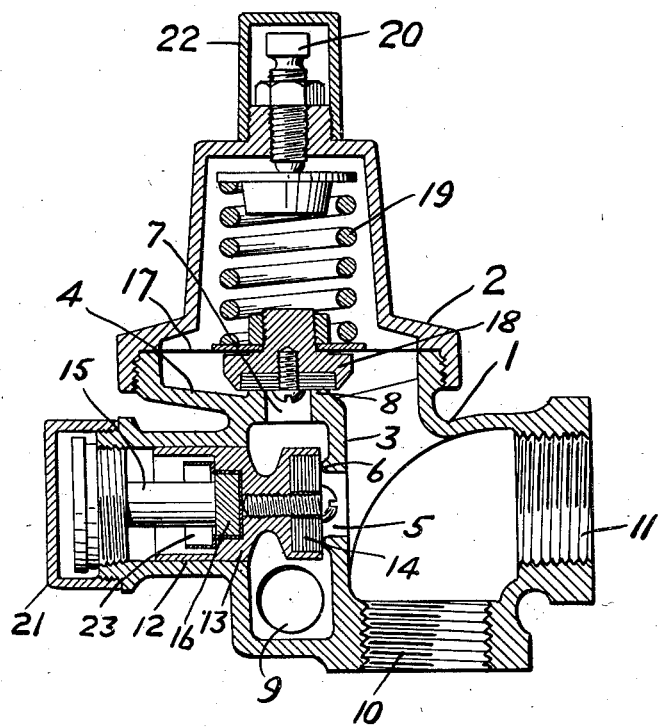
WITNESS:
INVENTOR
Luther D. Lovekin
BY
Augustus B. Stoughton
ATTORNEY.

Patented Apr. 19, 1932

1,854,750

UNITED STATES PATENT OFFICE

LUTHER D. LOVEKIN, OF VILLANOVA, PENNSYLVANIA

PRESSURE AND TEMPERATURE VALVE DEVICE FOR HOT WATER SUPPLIES

Application filed May 5, 1931. Serial No. 535,184.

The principal objects of the present invention are to provide a pressure and temperature responsive valve device for use with a hot water supply and in which a comparatively small fusible body, as of alloy, is employed and in which a relatively light diaphragm spring suffices, and to provide a compact, reliable and efficient device of the character referred to.

Other objects of the invention will appear from the following description at the end of which the invention will be claimed.

Generally stated, the invention comprises a temperature and pressure controlled device including a casing having a water chamber including a water inlet and a water outlet and also having a waste water chamber, there being provided ports between said chambers, a spring pressed diaphragm valve for one of said ports having its diaphragm exposed to water in the water chamber, a piston valve for the other of said ports, and a fusible body arranged to be heated by conduction and adapted for normally holding the piston valve closed.

The invention also comprises the improvements to be presently described and finally claimed.

In the following description reference will be made to the accompanying drawing in which the single figure is a vertical central sectional view of a device embodying features of the invention.

Referring to the drawing, 1 and 2 are the parts of a casing. The part 2 is a bonnet and the part 1 is a body internally provided with partitions 3 and 4, ranging substantially at right angles to each other. The partition 3 is provided with a port 5 having a raised seat 6, and the partition 4 is provided with a port 7 having a raised seat 8. The partitions define a waste water chamber having a waste opening 9, and a water chamber shown to the right and above the waste chamber, and the water chamber is provided with fluidways 10 and 11, which may be respectively connected with a supply of hot water, for example, a boiler and with a house hot water distribution system. The body is provided with a cylinder 12 confronting the port 5. There is a valve for the port 5, and it comprises a plunger 13 movable in the cylinder 12, and a fiber or rubber valve disk 14. 15 is a screw spindle accessible from the exterior of the casing. 16 is a fusible body interposed between the spindle and plunger. 17 is a diaphragm arranged between the body 1 and bonnet 2 and exposed to the water chamber. 18 is a disk valve carried by the diaphragm and arranged for cooperation with the port 7. 19 is a spring arranged in the body and pressing on the diaphragm with a pressure that can be adjusted by the set screw 20. 21 and 22 are removable caps or covers.

Assuming that the waterways 10 and 11 are connected in a hot water supply line such as may extend from a boiler to a house service, a description of the operation of the device will be given. As long as the temperature of the water remains below a desirable temperature, both valves 14 and 18 are closed and water fills the chamber under the diaphragm 17. The effect of a rise in temperature of the water is to increase its pressure by expansion, and this may occur at a temperature lower that the desirable limiting temperature of the water. Such increase in pressure, acting on the diaphragm 17, raises the valve 18 against the pressure of the spring 19, thus permitting water to flow through the port 7 into the waste chamber and out at 9, thus the pressure in the water is relieved and the valve 18 reseats. This operation may occur repeatedly without affecting the temperature responsive valve. Should the temperature of the water become high enough, the body 16 is softened by heat conducted to it, permitting the valve 14 to open and permit of the escape of hot water, which of course is replaced by cold water. The valve 14 is thereupon closed by turning the spindle 15, or by removing it and putting in a new fusible body 16 and then replacing the spindle.

In connection with the described device it may be said that since the spring 19 does not operate through the fusible body 16, the latter may be comparatively small which is obviously advantageous, and it may be said that 23 indicates a holder for the fusible body 16, and this holder is convenient in renewing the body 16.

It will be obvious to those skilled in the art to which the invention relates that modifications may be made in details of construction and arrangement and matters of mere form without departing from the spirit of the invention which is not limited to such matters or otherwise than the prior art and the appended claims may require.

I claim:

1. A temperature and pressure control valve device comprising in combination a casing having a water chamber including a water inlet and a water outlet and also having a waste chamber, there being provided ports between said chambers, a spring pressed diaphragm valve for one of said ports having its diaphragm exposed to water in the water chamber, a piston valve for the other of said ports, and a fusible body arranged to be heated by conduction and adapted for holding the piston valve closed.

2. A temperature and pressure control valve device comprising in combination a two part casing of which one is a bonnet and the other is a body internally provided with two partitions ranging substantially at right angles to each other and each having a port and a valve seat, said partitions defining a water chamber and a waste chamber and each having a fluidway, said body being provided with a cylinder confronting one of said ports, a valve for the last mentioned port comprising a plunger in said cylinder and a valve disk, a spindle, a fusible body interposed between the spindle and plunger, a diaphragm arranged between the body and bonnet and exposed to said water chamber, a disk valve carried by the diaphragm and arranged for cooperation with the other port, and a spring arranged in the bonnet and pressing on the diaphragm.

LUTHER D. LOVEKIN.